United States Patent
Varma et al.

(10) Patent No.: US 12,081,507 B2
(45) Date of Patent: Sep. 3, 2024

(54) SYSTEM AND METHOD FOR GENERATING USER-SPECIFIC INTERFACES

(71) Applicant: Yahoo Assets LLC, Dulles, VA (US)

(72) Inventors: Nikita Varma, Milpitas, CA (US); Ashish K. Dharamshi, Sunnyvale, CA (US); Gnanavel Shanmugam, San Jose, CA (US); Mohit Goenka, Santa Clara, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 17/877,591

(22) Filed: Jul. 29, 2022

(65) Prior Publication Data

US 2024/0039882 A1  Feb. 1, 2024

(51) Int. Cl.
*H04L 51/07* (2022.01)
*G06F 3/0481* (2022.01)
*G06F 3/0483* (2013.01)
*G06N 20/00* (2019.01)
*H04L 51/42* (2022.01)
*G06F 3/048* (2013.01)
*H04M 1/72436* (2021.01)
*H04M 1/72484* (2021.01)

(52) U.S. Cl.
CPC ............ *H04L 51/42* (2022.05); *G06F 3/0481* (2013.01); *G06F 3/0483* (2013.01); *G06N 20/00* (2019.01); *H04L 51/07* (2022.05); *G06F 3/048* (2013.01); *H04M 1/72436* (2021.01); *H04M 1/72484* (2021.01)

(58) Field of Classification Search
CPC ....... H04L 51/42; H04L 51/07; H04L 51/224; H04L 51/48; G06N 20/00; G06F 3/048; G06F 3/0481; G06F 3/0483; H04M 1/72436; H04M 1/72484; H04M 1/72454; G06Q 10/107
USPC .......................................................... 715/751
See application file for complete search history.

(56) References Cited

U.S. PATENT DOCUMENTS

| | | | |
|---|---|---|---|
| 10,917,371 B2 * | 2/2021 | Miklos ..................... | G06F 16/00 |
| 11,146,524 B2 * | 10/2021 | Baughman ............ | H04L 51/224 |
| 11,163,617 B2 * | 11/2021 | Balik ....................... | G06F 16/35 |
| 2014/0359480 A1 * | 12/2014 | Vellal ..................... | H04L 51/216 |
| | | | 715/752 |
| 2015/0169142 A1 * | 6/2015 | Longo ................ | H04M 1/72457 |
| | | | 715/751 |
| 2017/0308590 A1 * | 10/2017 | Ramesan .............. | H04L 51/046 |
| 2018/0004373 A1 * | 1/2018 | Peacock .................. | G06F 40/30 |

(Continued)

*Primary Examiner* — K C Chen
(74) *Attorney, Agent, or Firm* — Cooper Legal Group LLC

(57) ABSTRACT

One or more computing devices, systems, and/or methods for generating a user-specific interface are provided. In an example, a user-specific machine learning model, for a user of an email application, may be trained based upon one or more interactions of the user with a device upon which the email application is installed. A determination may be made that an email message has been received by an email account of the user. A user-specific message interface may be generated based upon (i) the trained user-specific machine learning model and (ii) content of the email message. A notification of the email message may be provided for display on the device of the user. In response to the user selecting the notification of the email message, the user-specific interface may be provided for display on the device of the user.

20 Claims, 11 Drawing Sheets

(56) References Cited

U.S. PATENT DOCUMENTS

| | | | |
|---|---|---|---|
| 2018/0189343 A1* | 7/2018 | Embiricos | G06F 16/2358 |
| 2018/0234375 A1* | 8/2018 | Gray | G06Q 10/107 |
| 2019/0182342 A1* | 6/2019 | Goenka | G06F 40/205 |
| 2020/0153920 A1* | 5/2020 | Chauhan | H04L 63/0428 |
| 2020/0213405 A1* | 7/2020 | Goenka | H04L 51/214 |
| 2021/0192280 A1* | 6/2021 | Zhang | G06N 20/20 |
| 2023/0007042 A1* | 1/2023 | Haworth | H04L 63/205 |
| 2023/0061547 A1* | 3/2023 | Russell | G06Q 10/06315 |
| 2023/0153635 A1* | 5/2023 | Chaudhary | G06N 5/02 |
| | | | 706/46 |

\* cited by examiner

SYSTEM AND METHOD FOR GENERATING USER-SPECIFIC INTERFACES

BACKGROUND

Many services, such as instant messaging services, email services, social networks and/or apps may allow a user to create an account capable of sending and receiving messages, such as an email account. The account may be presented via a graphical user interface, which may be used by the user to view, determine a significance of and/or act upon received messages. For example, the user may read, archive, delete, ignore, reply to, and/or forward a received message, and/or may navigate from the message to one or more webpages.

SUMMARY

In accordance with the present disclosure, one or more computing devices and/or methods are provided. In an example, a user-specific machine learning model, for a user of an email application, may be trained based upon one or more interactions of the user with a device upon which the email application is installed. A determination may be made that an email message has been received by an email account of the user. A user-specific message interface may be generated based upon (i) the trained user-specific machine learning model and (ii) content of the email message. A notification of the email message may be provided for display on the device of the user. In response to the user selecting the notification of the email message, the user-specific interface may be provided for display on the device of the user.

In an example, a user-specific machine learning model, for a user of an application, may be trained based upon one or more interactions of the user with a device upon which the application is installed. A determination may be made that a message has been received by an account of the user. A user-specific message interface may be generated based upon (i) the trained user-specific machine learning model and (ii) content of the message. A notification of the message may be provided for display on the device of the user. In response to the user selecting the notification of the message, the user-specific interface may be provided for display on the device of the user.

In an example, a user-specific machine learning model for a user may be trained based upon one or more interactions of the user. A determination may be made that content has been received in association with the user. A user-specific interface may be generated based upon (i) the trained user-specific machine learning model and (ii) the content. The user-specific interface may be provided for display on the device of the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
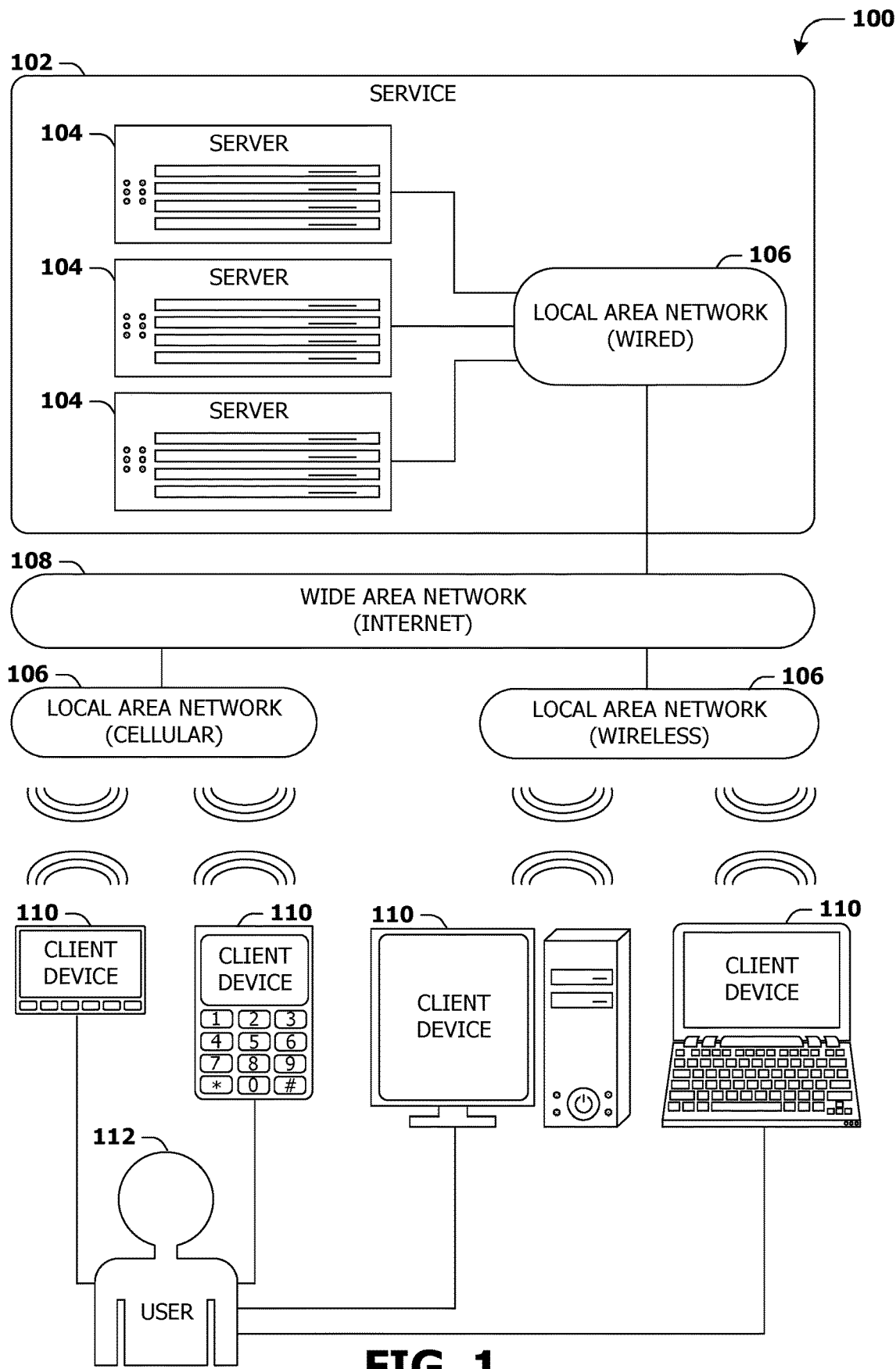
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
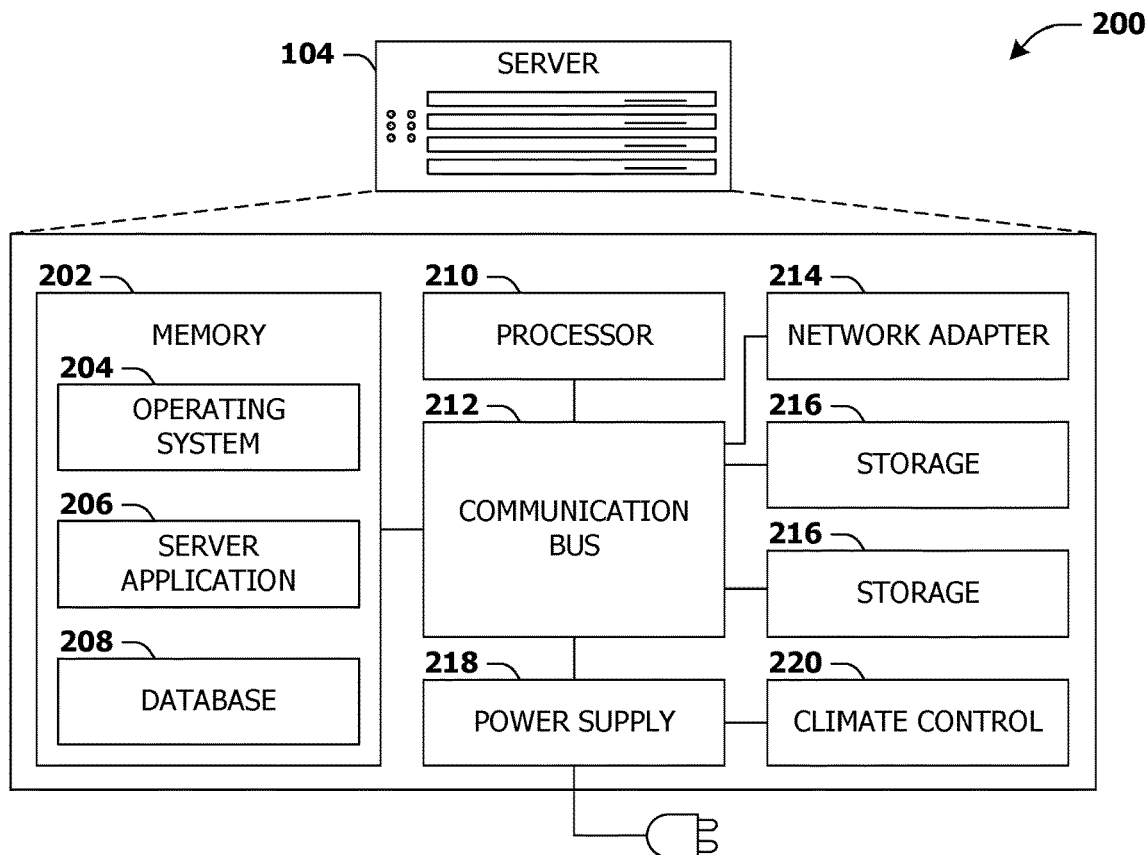
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
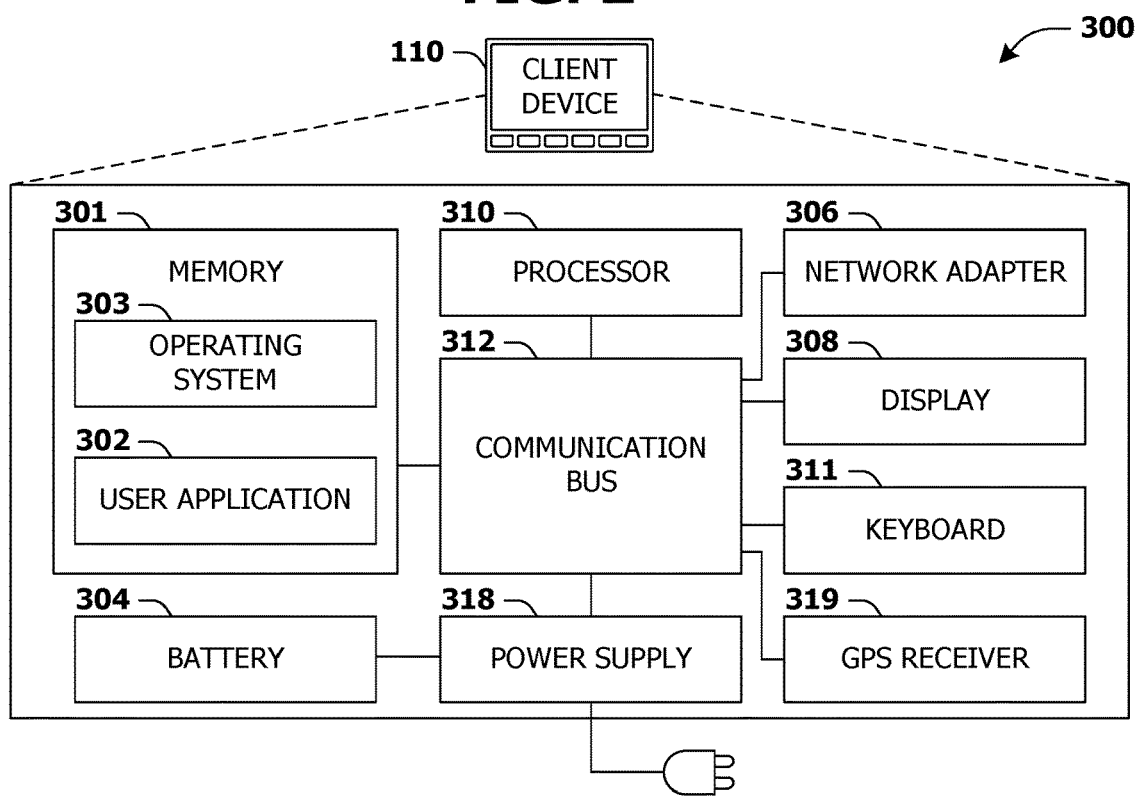
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating and providing a user-specific interface for display via one or more client devices are provided. For example, a user may have a messaging account (e.g., such as an email account, an instant messaging account, a social network account, a phone call account, a fax account, a video call account, etc.). A plurality of messages (e.g., email messages, instant messages, social network messages/posts, (e.g., logs and/or transcripts of) phone calls, faxes, video calls, etc.), associated with the messaging account, may be received (e.g., by a server and/or a client device of the user). The plurality of messages may comprise promotions from various businesses, as well as personal correspondence and/or work-related correspondence. Each message may be usable to perform one or more actions, such as shopping for products or services, signing a document, subscribing or unsubscribing from a message list, and/or applying a discount and/or other condition (e.g., free shipping, gift, upgrade, accessory, etc.) for one or more purchases and/or transactions. The user may want to view and/or interact with various messages of the plurality of messages via one or more interfaces on the client device (e.g., such as an email client, a browser, an app, or another interface on the client device).

Opening and/or viewing each of the plurality of messages, deciding which of the plurality of messages comprise content that the user is interested in interacting with, and determining what (if any) action the user wants to perform in relation with each message may requiring selecting each message (e.g., by selecting a notification presenting the message and/or selecting the message from a list/folder of messages), evaluating each message to identify the possible actions that can be taken, evaluating the possible actions for each message to determine which (if any) action the user is interested in taking, returning to the list/folder of messages, and then proceeding to a next message, and thus may consume a significant amount of time and/or resources of the client device, as well as time and/or effort of the user.

Additionally, a user may have more interest, use, ability, etc. to perform a certain action (in relation to a particular message) rather than others, while a different user that receives the same and/or a similar message might have more interest, use, ability, etc. to perform a different action (in relation to the same and/or similar message) rather than others. For example, when a message advertising the products of a retailer is received by both the user and the different user, the user may desire to view shopping options that are relevant to content of the message and/or interests of the user, while the different user may desire to unsubscribe from the retailer's mailing list.

However, in conventional systems, the message may simply be presented in the same manner to both the user and the different user (e.g., upon selection of the message by the respective user). Thus, the user would need to review and evaluate the message, decide that he wants to view more shopping options, manually open a separate interface to access additional shopping options, and perform further browsing and/or querying to identify shopping options relevant to the message from the retailer. The different user would, in turn, need to review and evaluate the message, decide that she does not want to receive further messages from the retailer, navigate to a portion of the message and/or a webpage of the retailer for unsubscribing from the mailing list, and complete a form requesting that she be removed from the mailing list.

Thus, in conventional systems, the action that each user desires to take with respect to a message may not be easily accessible, and the client device may be required to use an excessive amount of hardware resources (e.g., processor power) to perform the action, such as processing input for opening a new tab or browser and/or browsing to content pertaining to the action, a narrowing search to identify content relevant to the message, and presenting the identified content for further interaction. Alternatively and/or additionally, resources of the client device may be occupied with presenting the user with other messages and/or functions, and the client device may thus cause the user to lose and/or otherwise fail to interact with the message effectively and/or efficiently in conventional systems.

Thus, in accordance with one or more of the techniques herein, a user-specific machine learning model may be generated and/or trained for the user, and/or a second user-specific machine learning model may be generated and/or trained for the second user. The user-specific machine learning model may be trained based upon one or more interactions of the user with the client device, and may be used to generate a user-specific message interface for presenting the message to the user. The second user-specific machine learning model may be trained based upon one or more second interactions of the second user with the second client device, and may be used to generate a second user-specific message interface for presenting the (same) message to the second user. For example, the (same) message may be presented to the user in a manner customized for the user via the user-specific message interface (e.g., which may augment content of the message with shopping options), while the (same) message may be presented to the second user in a manner customized for the second user (different from the manner customized for the user, for example) via the second user-specific message interface (e.g., which may augment content of the message with options for modifying a subscription status).

Thus, in accordance with one or more of the techniques presented herein, the respective action preferred for each user may be performed by that user with greater speed (e.g., as the respective client device graphically presents the corresponding user-specific message interface representative of the message) and improved accuracy (e.g., as the client device decreases the probability of the respective action being overlooked, not found by the respective user, etc.). Accordingly, the generation and/or presentation of user-specific interfaces (e.g., and/or one or more other actions) described herein improves the speed, accuracy and usability of computer displays.

Figure 4:
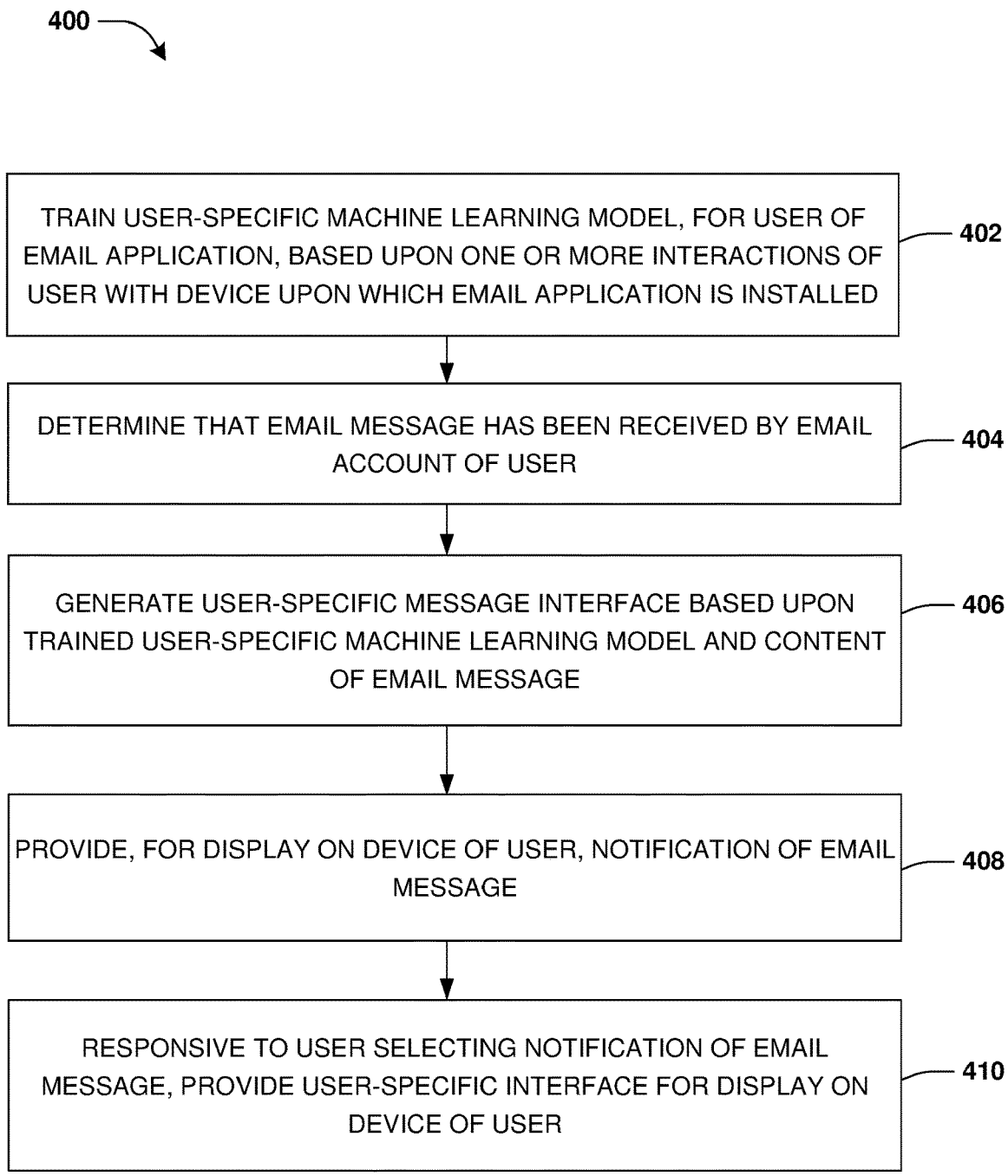
FIG. 4 is a flow chart illustrating an example method for generating and providing a user-specific interface for display via one or more client devices.

An embodiment of generating and presenting a user-specific interface for display on a device (e.g., mobile phone, a laptop, a desktop computer, etc.) of a user is illustrated by an example method 400 of FIG. 4. A user, such as user Jill, (e.g., and/or a client device) may access and/or interact with a service for sending and receiving messages, such as an email service, an instant messaging service, a social network, an app, etc. The messages may be stored in one or more databases for a messaging account, such as a first database for an inbox (e.g., and/or log of incoming communications) of the messaging account, a second database for a sent box (e.g., and/or log of outgoing communications) of the messaging account, etc. In some examples, the device of the user may have one or more applications installed on it in association with one or more services, where such application(s) may include an email application, a search application, a text messaging application, a social media application, etc. One or more of the applications on the device may be linked to the messaging account. For example, the email application may be linked to an email account of the user. The messaging account of the user with the service may be accessed and/or interacted with (and/or the user may otherwise interact with the device and/or perform one or more actions) via one or more interfaces on the device, such as the aforementioned email application, a browser, an app, or another interface on the client device.

At 402, a user-specific machine learning model may be trained for the user. The training of the user-specific machine learning model may be based upon one or more interactions of the user with the device. Such interactions may include interactions with one or more messages in the messaging account, such as opening a message, replying to a message, forwarding a message, sharing a message (e.g., via a social media feed, a blog, etc.), ignoring a message, not opening a message (e.g., even after a portion of the message is displayed), deleting a message, marking a message as spam, associating a message with a label and/or folder, etc. The interactions may alternatively and/or additionally include actions performed (within a threshold period of time, for example) before, after or during the viewing of one or more messages in the messaging account, within or external to the messaging application. For example, the interactions may indicate that upon (and/or within a threshold period of time of) receiving and/or opening a message associated with a first characteristic (e.g., topic, sender, receiver, language, location, etc.), the user opened a browser and/or navigating to content associated with the first characteristic, and/or that upon receiving and/or opening a message associated with a second characteristic (e.g., topic, sender, receiver, language, location, etc.), the user scrolled to the bottom of the message and then opened a browser and searched for "how to unsubscribe from" the sender of the message.

In some examples, the user-specific machine learning model may further be supplemented using interactions of the user (and/or one or more users determined to be similar to the user) with one or more other devices. The user-specific machine learning model used for a user may be a combination of a model generated for the user's messaging account and one or more global expectation models generated for a plurality of users, a set of users (e.g., employees of a company), a subset (e.g., engineers at the company), etc.

The user-specific machine learning model may be continuously trained over days, months and/or years based upon interactions of the user with the device. Accordingly, the user-specific machine learning model can continuously improve the accuracy and/or depth of its understanding of the user's interactions with the device, which will in turn improve the accuracy, efficiency and/or effectiveness of the interface of the messaging application with which the user interacts using the techniques described herein.

The user-specific machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc.

At 404, a determination may be made that a message has been received by the messaging account of the user. For example, the determination may be made by the messaging application on the device of the user when the messaging application receives the message from a server hosting the messaging account. Alternatively and/or additionally, the determination may be made by the server hosting the messaging account when the server receives the message from a second server responsible for transmitting the message on behalf of a sender of the message.

At 406, a user-specific message interface may be generated based upon the trained user-specific machine learning model and/or content of the message. For example, the message (e.g., including a header and/or body of the message) may be scanned and/or analyzed to identify one or more attributes of the message. The one or more attributes may comprise one or more topics associated with content in the message, a sender of the message, one or more recipients to which the message is addressed, one or more languages of content in the message, one or more times associated with the message (e.g., a time the message was sent, a time the message was received, a time a notification of the message was presented, a time the message and/or the notification of the message was accessed, etc.) and/or one or more locations associated with the message (e.g., a location of a sender of the message, a location of one or more recipients of the message, a location of an entity indicated by and/or otherwise associated with the message, etc.).

The one or more attributes of the message may be applied and/or otherwise input to the user-specific machine learning model, and the user-specific machine learning model may output one or more user interests associated with the content of the message. For example, the user-specific machine learning model may use the one or more attributes to predict that the user will have a particular user interest (e.g., to perform one or more actions) upon and/or in response to viewing the content of the message. Supplemental content may be generated based upon the predicted user interest. The supplemental content may be generated using content within the message, using one or more profiles associated with the user, and/or by accessing content external to the message and/or profiles of the user. For example, the supplemental content may be retrieved from one or more webpages, one or more other messages, and/or one or more alternative tabs of the messaging application.

In some examples, the user-specific message interface may be created by combining the supplemental content with content of the message (e.g., one or more portions of the message and/or all of the message). Alternatively and/or additionally, the user-specific message interface may be created using the supplemental content, but may not, for example, comprise one or more portions of the message. In some examples, the messaging application may be configured to have a plurality of selectable tabs, such as a messaging tab, a contacts tab, a shopping tab, a travel tab, a subscriptions tab, a receipts tab, and/or a people tab. An alternative tab may be identified, from among the plurality of tabs, based upon the predicted user interest associated with the message, and the user-specific message interface may be created using the alternative tab, for example.

At 408, a notification of the message may be provided for display on the device of the user. The notification may be a push (e.g., from a server) and/or local (e.g., on a client device) alert that may be presented on the client device, and may include at least some of and/or a summary of the message. The notification may come in one or more forms (e.g., corresponding to one or more different statuses of the client device), such as a banner which may be temporary and/or persistent (e.g., on top and/or on bottom of screen), a badge (e.g., on an icon), an audio alert, etc. In some examples, the notification may be generated and/or provided for display prior to the generation of the user-specific message interface. In some examples, the user-specific message interface may be generated (and/or stored for future retrieval and/or use) prior to the generation and/or display of the notification.

The user may select the notification of the message and/or may otherwise make one or more selections to access the message (e.g., by opening the messaging application and selecting the message from a list of messages). At 410, in response to the selection of the notification of the message by the user (and/or in response to the one or more selections to access the message), the user-specific message interface (e.g., which was generated for the user using the trained user-specific machine learning model) may be provided for display on the device (e.g., instead of merely displaying content and/or a body of the message). For example, the combination of the supplemental content with content of the message may be provided in the user-specific message interface, and/or the supplemental content may be provided in the user-specific message interface without content of the message, and/or the alternative tab identified in association with the message may be provided in (and/or as) the user-specific message interface.

Figure 5A:
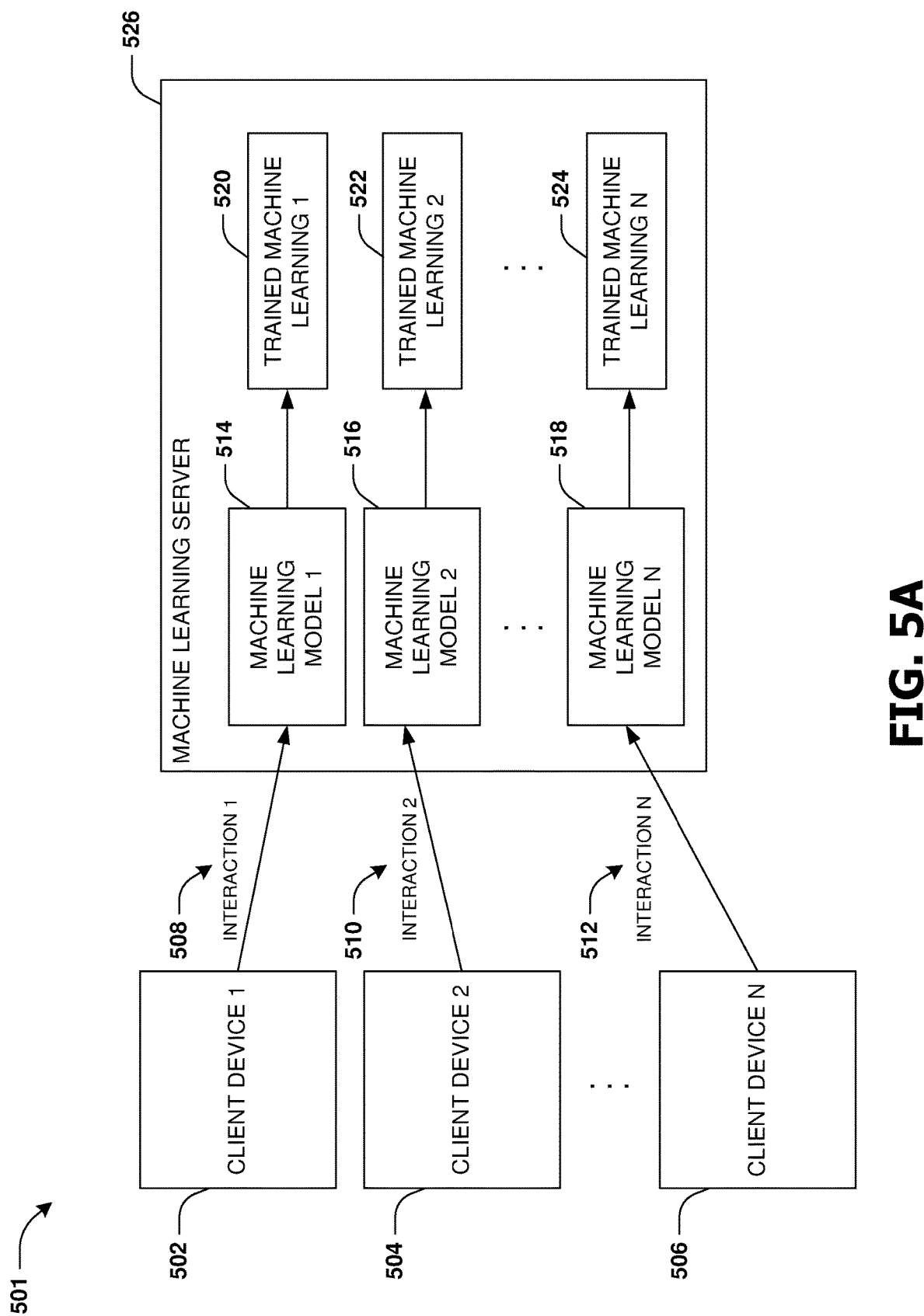
FIG. 5A is a component block diagram illustrating an example system for generating and providing a user-specific interface for display via one or more client devices.
Figure 5B:
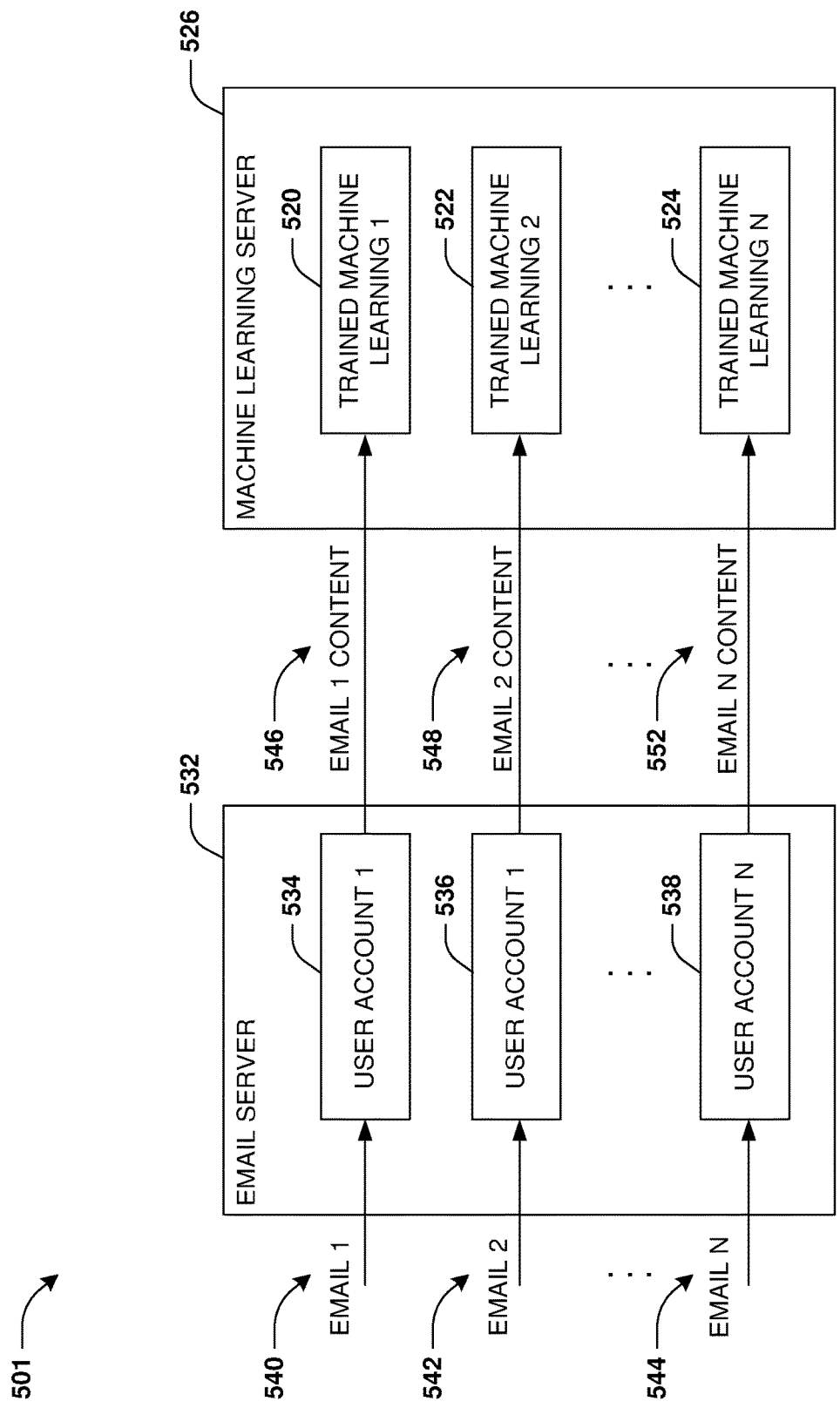
FIG. 5B is a component block diagram illustrating an example system for generating and providing a user-specific interface for display via one or more client devices.
Figure 5C:
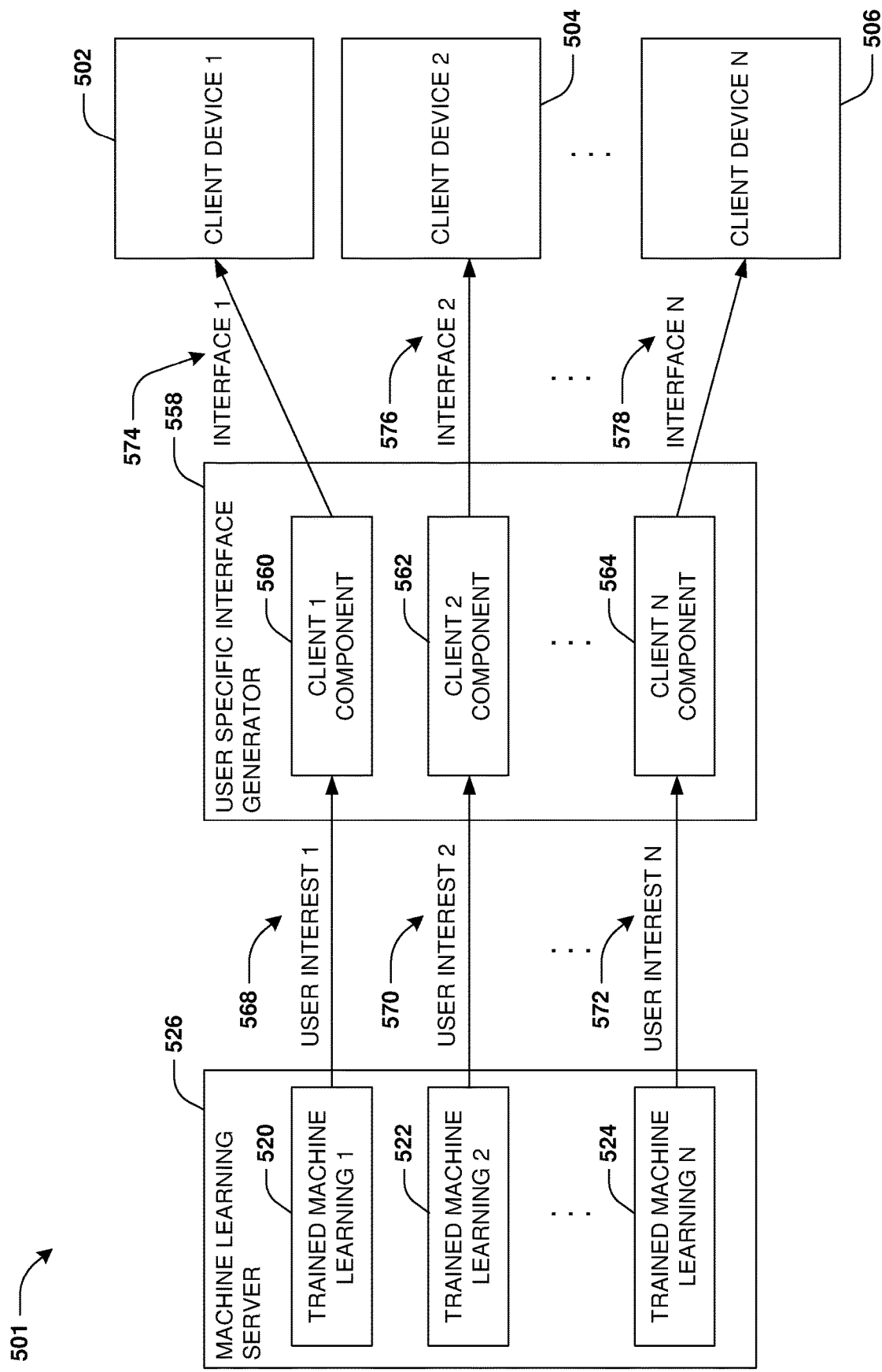
FIG. 5C is a component block diagram illustrating an example system for generating and providing a user-specific interface for display via one or more client devices.

FIGS. 5A-5C illustrate a system 501 for generating and presenting a user-specific interface for display on a device (e.g., mobile phone, a laptop, a desktop computer, etc.) of a user. As shown in FIG. 5A, the system 501 may comprise a machine learning server 526, which may be associated with a service (e.g., an email service, instant messaging service, etc.) supporting an application installed on a device and/or a web-based application (e.g., accessible via a browser). The machine learning server 526 may receive data from one or more client devices that use the service, such as a first client device 502 of a first user, a second client device 504 of a second user, and/or an Nth client device 506 of an Nth user. The machine learning server 526 may comprise a model for each of the client devices (and/or for each of their users), such as a first machine learning model 514 for the first client device 502 and/or the first user, a second machine learning model 516 for the second client device 504 and/or the second user, and/or an Nth machine learning model 518 for the Nth client device 506 and/or the Nth user.

Each of the client devices may provide the machine learning server 526 (e.g., directly and/or via one or more intermediaries) information indicative of one or more interactions performed using the client device and/or other information about the client device and/or the user of the client device. For example, the machine learning server 526 may receive first interaction data 508 (e.g., indicative of the first user opening a first received message and then opening a browser and navigating to a shopping-related webpage) from the first client device 502, and may train the first machine learning model 514 with the first interaction data 508 to generate the first trained machine learning model 520. The machine learning server 526 may receive second interaction data 510 (e.g., indicative of the second user opening the first received message and then deleting the first received message) from the second client device 504, and may train the second machine learning model 516 with the first interaction data 510 to generate the first trained machine learning model 522. The machine learning server 526 may receive Nth interaction data 512 (e.g., indicative of the Nth user opening an Nth received message and then opening a browser and navigating to a travel-related webpage) from the Nth client device 506, and may train the Nth machine learning model 518 with the Nth interaction data 512 to generate the Nth trained machine learning model 524.

As shown in FIG. 5B, the system 501 may comprise a messaging server 532 (e.g., an email server). The messaging server 532 may comprise a user account for each of the client devices (and/or for each of their users), such as a first user account 534 for the first client device 502 and/or the first user, a second user account 536 for the second client device 504 and/or the second user, and/or an Nth user account 538 for the Nth client device 506 and/or the Nth user. Messages addressed to each of the client devices (and/or for each of their users) may be received by the messaging server 532 (e.g., from one or more other messaging servers associated with senders of the messages). For example, the messaging server 532 may receive a first message 540 (e.g., comprising one or more promotions from a retailer) addressed to the first user and/or the first client device 502, and may deliver and/or store the first message 540 in association with the first user account 534 (e.g., by including the first message 540 in an inbox of the first user account 534). The messaging server 532 may receive a second message 542 (e.g., which may be similar and/or the same as the first message 542 and/or may comprise one or more promotions from the retailer) addressed to the second user and/or the second client device 504, and may deliver and/or store the second message 542 in association with the second user account 536 (e.g., by including the second message 542 in an inbox of the second user account 536). The messaging server 532 may receive an Nth message 544 (e.g., comprising an advertisement regarding one or more flights) addressed to the Nth user and/or the Nth client device 506, and may deliver and/or store the Nth message 544 in association with the Nth user account 538 (e.g., by including the Nth message 540 in an inbox of the Nth user account 538).

The messaging server 532 may provide the machine learning server 526 content associated with each of the messages received for each of the user accounts. The content associated with each message may be generated by the messaging server 532 and/or may comprise all of the corresponding message, one or more portions (e.g., a body) of the corresponding message, and/or a combination of one or more portions of the corresponding message with additional information (e.g., one or more portions of other messages, information about one or more users, information retrieved from one or more webpages associated with the corresponding message, etc.). For example, the messaging server 532 may provide first content 546 associated with the first message 540 (e.g., one or more portions of and/or all of the first message 540) to the machine learning server 526 and/or to the first trained machine learning model 520, the messaging server 532 may provide second content 548 associated with the second message 542 (e.g., one or more portions of and/or all of the second message 542) to the machine learning server 526 and/or to the second trained machine learning model 522, and/or the messaging server 532 may provide Nth content 552 associated with the Nth message 544 (e.g., one or more portions of and/or all of the Nth message 544) to the machine learning server 526 and/or to the Nth trained machine learning model 524.

The machine learning server 526 may use each trained machine learning model to determine (e.g., infer, deduce, predict, etc.) a user interest of each user in consuming, interacting with and/or responding to the message addressed to that user (and/or consuming, interacting with and/or responding to other content in association with the message). For example, the machine learning server 526 may apply the first content 546 associated with the first message 540 to the first trained machine learning model 520. The first trained machine learning model 520 may process the first content 546 to determine that the first user may be expected to have a first user interest 568 (illustrated in FIG. 5C) in shopping for one or more products and/or services upon viewing the first message 540 (e.g., in view of the first trained machine learning model 520 having previously learned from the first interaction data 508 that the user had previously opening a browser and navigating to a shopping-related webpage upon receiving the first received message).

The machine learning server 526 may apply the second content 548 associated with the second message 542 to the second trained machine learning model 522. The second trained machine learning model 522 may process the second content 548 to determine that the second user may be expected to be have a second user interest 570 (illustrated in FIG. 5C) in ceasing to receive messages from retailers and/or unsubscribing from the mailing lists of such retailers upon viewing the second message 542 (e.g., in view of the second trained machine learning model 522 having previously learned from the second interaction data 510 that the second user had previously deleted the second received message upon receiving the second received message).

The machine learning server 526 may apply the Nth content 552 associated with the Nth message 544 to the Nth trained machine learning model 524. The Nth trained machine learning model 524 may process the Nth content 552 to determine that the Nth user may be expected to be have an Nth user interest 572 (illustrated in FIG. 5C) in planning a vacation upon viewing the Nth message 544 (e.g., in view of the Nth trained machine learning model 524 having previously learned from the Nth interaction data 512 that the Nth user had previously opened a browser and navigated to a travel-related webpage upon receiving the Nth received message).

As shown in FIG. 5C, the system 501 may comprise a user-specific interface generator 558. The user-specific interface generator 558 may comprise an interface generating component for each user account, client devices and/or user, such as a first interface generating component 560 for the first user account 534, the first client device 502 and/or the first user, a second interface generating component 562 for the second user account 536, the second client device 504 and/or the second user, and/or an Nth interface generating component 564 for the Nth user account 538, the Nth client device 506 and/or the Nth user.

User interests associated with each user account, client device and/or users may be received by the user-specific interface generator 558 and/or the associated interface generating component. For example, a first interface generating component 560 may receive the first user interest 568 from the first trained machine learning model 520, and may generate a first user-specific interface 574 for the first client device 502. The first interface generating component 560 may incorporate content associated with shopping within the first user-specific interface 574, in view of the first user interest 568 (in shopping for one or more products and/or services) determined by the first trained machine learning model 520 and/or in view of technical parameters of the first client device 502 and/or software of the first client device 502. For example, the first interface generating component 560 may identify one or more webpages (and/or other sources of data) as being associated with the first message 540 and/or the first user interest 568, retrieve content (e.g., text and/or images) from the one or more webpages, format the retrieved webpage content in a manner deemed suitable for the first client device 502 and/or software of the first client device 502, and/or incorporate the formatted content (e.g., comprising shopping-related information) into the first user-specific interface 574 (in combination with, or without, one or more portions of the first message 540). Alternatively and/or additionally, the first interface generating component 560 may identify a tab (e.g., a shopping-related tab) from among a plurality of tabs (e.g., interfaces of an application, a web browser, etc.) as being a match for the first user interest 568, may tailor the tab to content of the first message 540 and/or to the first user interest 568, and/or may incorporate the tab into the first user-specific interface 574 (in combination with, or without, one or more portions of the first message 540). Alternatively and/or additionally, the first interface generating component 560 may identify one or more other messages (previously received and/or sent by the first user) as being associated with the first message 540 and/or the first user interest 568 (based upon a common sender, entity, category, etc.), retrieve content (e.g., text and/or images) from the one or more other messages, format the retrieved message content in a manner deemed suitable for the first client device 502 and/or software of the first client device 502, and/or incorporate the formatted content (e.g., comprising a summary of other purchases made by the user and/or relevant to the first message 540) into the first user-specific interface 574 (in combination with, or without, one or more portions of the first message 540).

A second interface generating component 562 may receive the second user interest 570 from the second trained machine learning model 522, and may generate a second user-specific interface 576 for the second client device 504. The second interface generating component 562 may incorporate content associated with unsubscribing from a mailing list within the second user-specific interface 576, in view of the second user interest 570 (in ceasing to receive messages from retailers and/or unsubscribing from the mailing lists of such retailers) determined by the second trained machine learning model 522 and/or in view of technical parameters of the second client device 504 and/or software of the second client device 504. For example, the second interface generating component 562 may identify one or more webpages (and/or other sources of data) as being associated with the second message 542 and/or the second user interest 570, retrieve content (e.g., text and/or images) from the one or more webpages, format the retrieved webpage content in a manner deemed suitable for the second client device 504 and/or software of the second client device 504, and/or incorporate the formatted content (e.g., comprising information about unsubscribing from a mailing list of a retailer) into the second user-specific interface 576 (in combination with, or without, one or more portions of the second message 542). Alternatively and/or additionally, the second interface generating component 562 may identify a tab (e.g., a subscription management-related tab) from among a plurality of tabs (e.g., interfaces of an application, a web browser, etc.) as being a match for the second user interest 570, may tailor the tab to content of the second message 542 and/or to the second user interest 570, and/or may incorporate the tab into the second user-specific interface 576 (in combination with, or without, one or more portions of the second message 542). Alternatively and/or additionally, the second interface generating component 562 may identify a portion of the second message 542 (e.g., a link for unsubscribing from a mailing list of the sender of the second message 542 near the bottom of the body of second message 542) from among a plurality of portions of the second message 542 as being a match for the second user interest 570, and may incorporate, highlight and/or otherwise focus on the identified portion in the second user-specific interface 576 (in combination with, or without, one or more other portions of the second message 542).

An Nth interface generating component 564 may receive the Nth user interest 572 from the Nth trained machine learning model 524, and may generate an Nth user-specific interface 578 for the Nth client device 506. The Nth interface generating component 564 may incorporate content associated with traveling within the Nth user-specific interface 578, in view of the Nth user interest 572 (in planning a vacation) determined by the Nth trained machine learning model 524 and/or in view of technical parameters of the Nth client device 506 and/or software of the Nth client device 506. For example, the Nth interface generating component 564 may identify one or more webpages (and/or other sources of data) as being associated with the Nth message 544 and/or the Nth user interest 572, retrieve content (e.g., text and/or images) from the one or more webpages, format the retrieved webpage content in a manner deemed suitable for the Nth client device 506 and/or software of the Nth client device 506, and/or incorporate the formatted content (e.g., comprising information about travelling, making flight reservations and/or booking hotels) into the Nth user-specific interface 578 (in combination with, or without, one or more portions of the Nth message 544). Alternatively and/or additionally, the Nth interface generating component 564 may identify a tab (e.g., a travel-related tab) from among a plurality of tabs (e.g., interfaces of an application, a web browser, etc.) as being a match for the Nth user interest 572, may tailor the tab to content of the Nth message 544 and/or to the Nth user interest 572, and/or may incorporate the tab into the Nth user-specific interface 578 (in combination with, or without, one or more portions of the Nth message 544). Alternatively and/or additionally, the Nth interface generating component 564 may identify a portion of the Nth message 544 (e.g., a link for booking a flight in the middle of the body of Nth message 544) from among a plurality of portions of the Nth message 544 as being a match for the Nth user interest 572, and may incorporate, highlight and/or otherwise focus on the identified portion in the Nth user-specific interface 578 (in combination with, or without, one or more other portions of the Nth message 544). Alternatively and/or additionally, the Nth interface generating component 564 may identify one or more other messages (previously received and/or sent by the Nth user) as being associated with the Nth message 544 and/or the Nth user interest 572 (based upon a common sender, entity, category, etc.), retrieve content (e.g., text and/or images) from the one or more other messages, format the retrieved message content in a manner deemed suitable for the Nth client device 506 and/or software of the Nth client device 506, and/or incorporate the formatted content (e.g., comprising a summary of other travel-related reservations made by the user and/or relevant to the Nth message 544) into the Nth user-specific interface 578 (in combination with, or without, one or more portions of the Nth message 544).

The user-specific interface generator 558 and/or each interface generating component may provide a generated user-specific interface to the corresponding client device. For example, the first interface generating component 560 may provide the first user-specific interface 574 to the first client device 502, and the first client device 502 may display the first user-specific interface 574 (e.g., comprising content associated with shopping) upon receipt and/or upon being prompted to do so (e.g., via user selection of the first message 540 and/or a notification of the first message 540). The second interface generating component 562 may provide the second user-specific interface 576 to the second client device 504, and the second client device 504 may display the second user-specific interface 576 (e.g., comprising content associated with unsubscribing from a mailing list) upon receipt and/or upon being prompted to do so (e.g., via user selection of the second message 540 and/or a notification of the second message 540). The Nth interface generating component 564 may provide the Nth user-specific interface 578 to the Nth client device 506, and the Nth client device 506 may display the Nth user-specific interface 578 (e.g., comprising content associated with traveling) upon receipt and/or upon being prompted to do so (e.g., via user selection of the Nth message 542 and/or a notification of the Nth message 542).

Thus, each user of the client devices may be presented with, and may interact with, a user-specific interface that is tailor-made for that particular user. As a result, even upon receiving and/or accessing the same and/or similar message (e.g., from a same retailer), the first user of the first client device 502 and the second user of the second client device 504 may have different (e.g., customized) experiences, as the first user may be presented with an interface that facilitates conveniently viewing shopping-related content when attempting to access the message in view of preferences of the first user learned by the trained machine learning model 520, while the second user may be presented with a (different) interface that facilitates conveniently unsubscribing from the retailer's mailing list when attempting to access the (same and/or similar) message in view of preferences of the second user learned by the second trained machine learning model 522, for example.

In some examples, each user-specific interface may be crafted to include a user-specific recommendation customized for the user. For example, even upon receiving and/or accessing the same and/or similar message indicative of a certain event and/or occurrence (e.g., a crash of a currency market), the first user of the first client device 502 and the second user of the second client device 504 may have different (e.g., customized) experiences, as the first user may be presented with an interface that recommends and/or facilitates conveniently selling the first user's stake in the currency market (by presenting a button for selling the first user's stake, for example) when attempting to access the message in view of preferences of the first user learned by the trained machine learning model 520 which may indicate that the first user is financially cautious and/or risk-averse, while the second user may be presented with a (different) interface that recommends and/or facilitates conveniently doubling down and/or making further investments (by presenting a button for buying more currency, for example) when attempting to access the (same and/or similar) message in view of preferences of the second user learned by the second trained machine learning model 522 which may indicate that the second user is financially bold and/or inclined to take risks, for example.

It may be appreciated that further interactions by the respective users with each user-specific interface may be received and/or tracked, and may be used to further train the corresponding user-specific machine learning model. For example, a determination may be made that the first user of the first client device 502 navigates the shopping-related content displayed in the first user-specific interface 574 to find and select a shopping item related to a first category (e.g., shoes), and purchases the shopping item, and the first trained machine learning model 520 may be trained with this feedback. Similarly, a determination may be made that the second user of the second client device 504 ignores, dismisses and/or otherwise does not interact with the content associated with unsubscribing from the mailing list displayed in the second user-specific interface 576, and the second trained machine learning model 522 may be trained with this feedback, for example.

Notably, while at least some of the examples described herein may involve generating and/or presenting a user-specific interface upon receiving selection of a notification of a message by using a trained user-specific model to process the message in the context of a messaging application, other examples are contemplated involving a call-to-action other than notifications and/or involving content to be processed other than messages, and may be in applications other than messaging applications, such as shopping applications, investing applications, banking applications, etc. For example, any call-to-action (e.g., receipt and/or selection of a deep link configured to direct a user of an application to a specific in-application location, selecting an example message from a list of messages, etc.) may be contemplated to trigger the generating and/or presenting of a user-specific interface, and any content (e.g., application content retrieved from the in-application location of the deep link, message content of the example message selected from the list of messages, etc.) may be contemplated to be used and/or processed by a trained user-specific model (e.g., with or without consideration of the call-to-action type) to generate the user-specific interface.

Figure 6A:
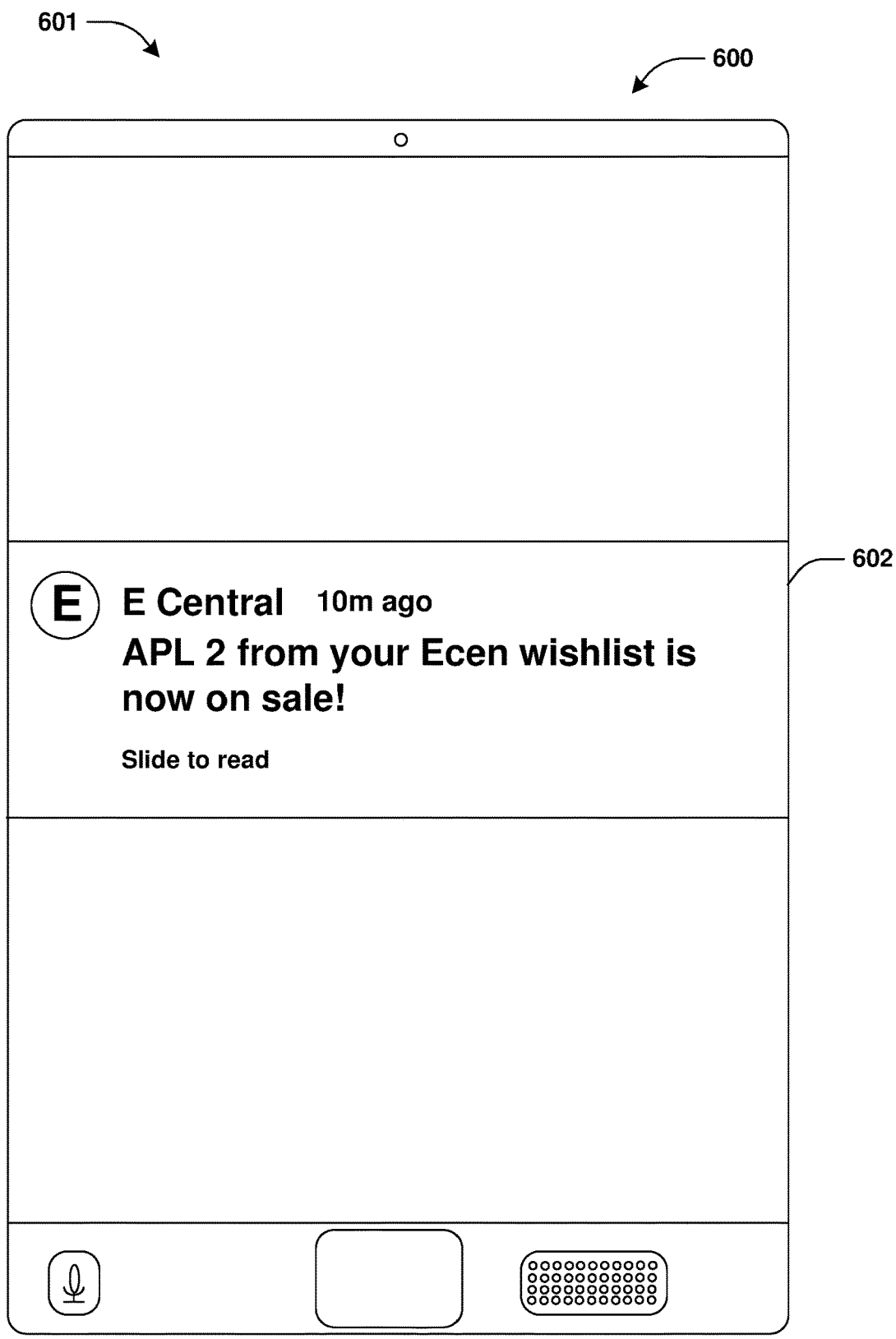
FIG. 6A is a diagram illustrating an example system for generating and providing a user-specific interface for display via one or more client devices.

FIGS. 6A-6D illustrate a system 601 for generating and presenting a user-specific interface for display on a device (e.g., mobile phone, a laptop, a desktop computer, etc.) of a user. FIG. 6A illustrates an interface 600 that may be displayed on the device of the user. The interface 600 may comprise a notification 602 that may be presented when a message (e.g., a new email message) is received for a user account (e.g., email account) of the user. The notification 602 may comprise a representation of a sender of the message (e.g., a name, email address, etc.), a subject of the message, a representation of a time of receipt of the message (e.g., a number of seconds, minutes, hours and/or days ago that the message was received, and/or an indication of the date of receipt and/or the time of receipt), and/or a representation of a body of the message (e.g., an excerpt of the body of the message, a summary of the body of the message and/or a translation of one or more portions of the body of the message from a foreign language to a language of the user).

Figure 6B:
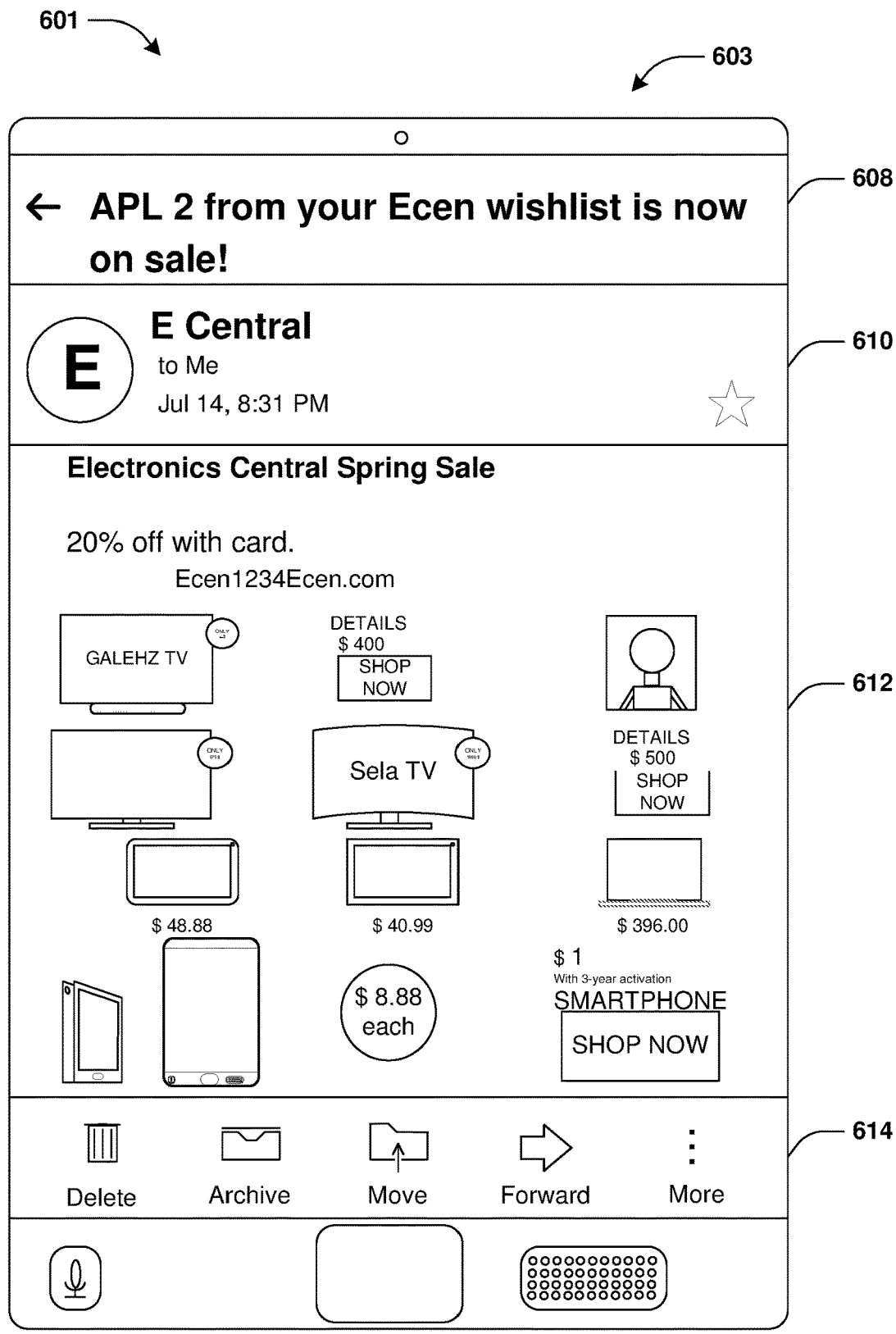
FIG. 6B is a diagram illustrating an example system for generating and providing a user-specific interface for display via one or more client devices.

FIG. 6B illustrates a second interface 603 that may be displayed on the device of the user (e.g., after the user selects the notification 602 displayed in FIG. 6A), such as when a default interface is to be presented to the user, when a user-specific interface is not generated and/or presented to the user, and/or when the user is determined (e.g., by a user-specific machine learning model trained using interactions of the user) to have a user interest in viewing the message without supplemental content, and a user-specific interface representative of that determined user interest is generated and/or presented to the user. The second interface 603 may comprise a portion of a messaging application (e.g., an email application) installed on the device and/or connected to the user account of the user, for example. For example, the second interface 603 may comprise a message interface that displays content of the message represented by the notification 602 of FIG. 6A. The second interface 603 may comprise a subject portion 608 indicative of the subject of the message, a header portion 610 indicative of the sender of the message, one or more recipients of the message and/or one or more times and/or dates associated with the message, and/or a body portion 612 indicative of content of the body of the message. The second interface 603 may further comprise an action menu 614 displaying one or more user selectable inputs each configured to perform an action in association with the message, such as a delete input configured to delete the message upon selection, an archive input configured to archive the message upon selection, a move input configured to move the message to a different folder and/or category upon selection, and/or a forward input configured to present an interface for forwarding the message to one or more recipients upon selection.

The messaging application may comprise one or more tabs, such as an inbox tab (e.g., associated with displaying one or more messages received by the user account and/or stored in an inbox of the user account), a video tab (e.g., associated with displaying one or more messages of the user that have video content), an attachments tab (e.g., associated with displaying one or more messages of the user that have attachments), a shopping tab (e.g., associated with displaying one or more messages of the user that have shopping-related content) and/or a travel tab (e.g., associated with displaying one or more messages of the user that have travel-related content), for example.

Figure 6C:
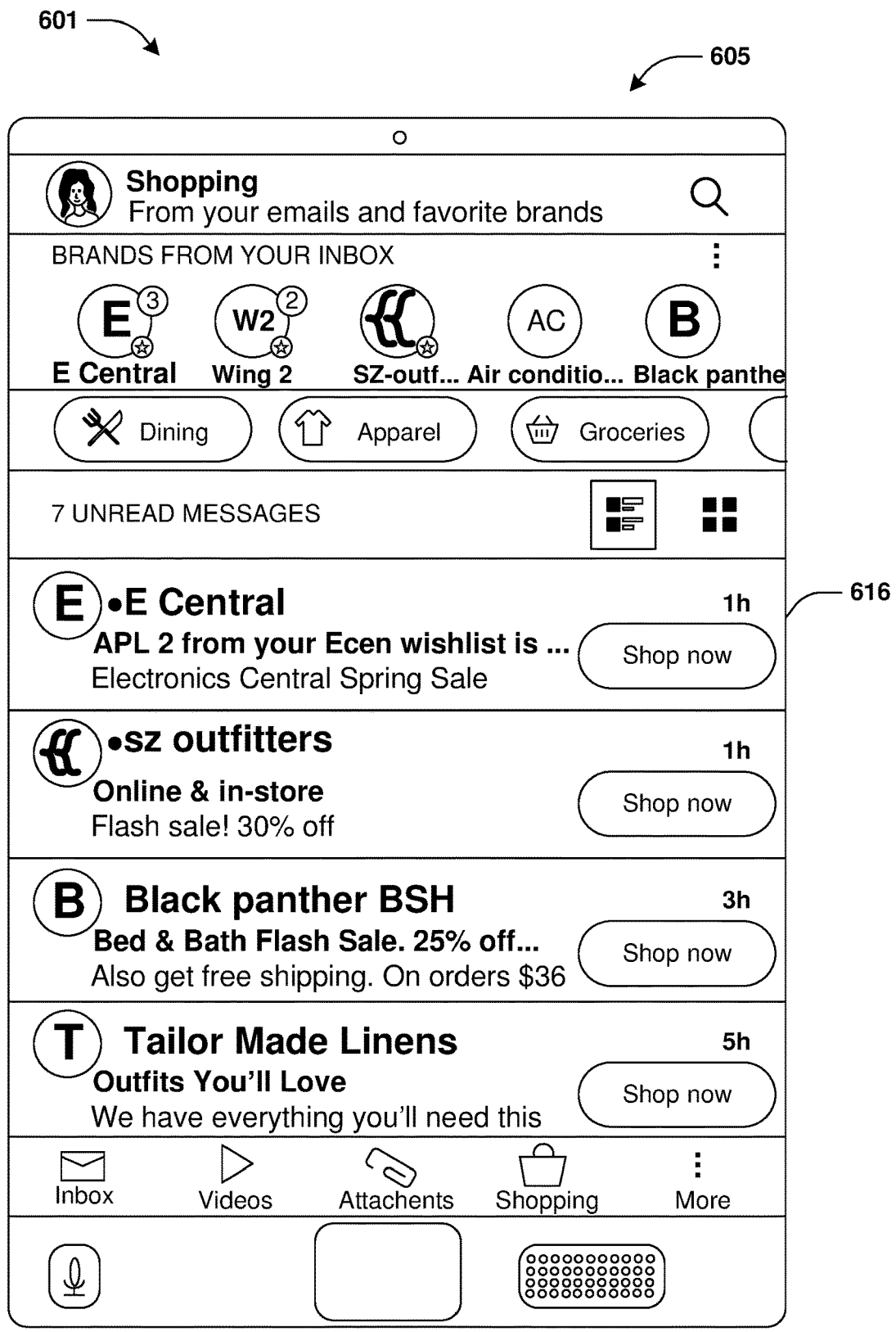
FIG. 6C is a diagram illustrating an example system for generating and providing a user-specific interface for display via one or more client devices.

FIG. 6C illustrates a third interface 605 that may be displayed on the device of the user (e.g., after the user selects the notification 602 displayed in FIG. 6A), such as when the user is determined (e.g., by the user-specific machine learning model trained using interactions of the user) to have a user interest in viewing a condensed representation of the message in the context of the shopping tab and/or other shopping-related messages, and a user-specific interface representative of that determined user interest is generated and/or presented to the user. The third interface 605 may comprise a portion of the messaging application installed on the device and/or connected to the user account of the user. For example, the third interface 605 may comprise the shopping tab that displays one or more messages of the user that have shopping-related content. The shopping-related messages of the user may include the message represented by the notification 602 of FIG. 6A. The third interface 605 may comprise a condensed representation 616 of the message, as well as condensed representations of one or more other shopping-related messages of the user. In some examples, the third interface 605 may display (in combination with the condensed representation 616 of the message, for example) message-based supplemental content determined to be related to the message, such as one or more messages from a same sender as the message, one or more messages related to a category of product and/or service associated with the message, and/or a listing of one or more purchases previously made (by the user, for example) and determined to be related (e.g., based upon sender, product, category, manufacturer, etc.) to the message.

Figure 6D:
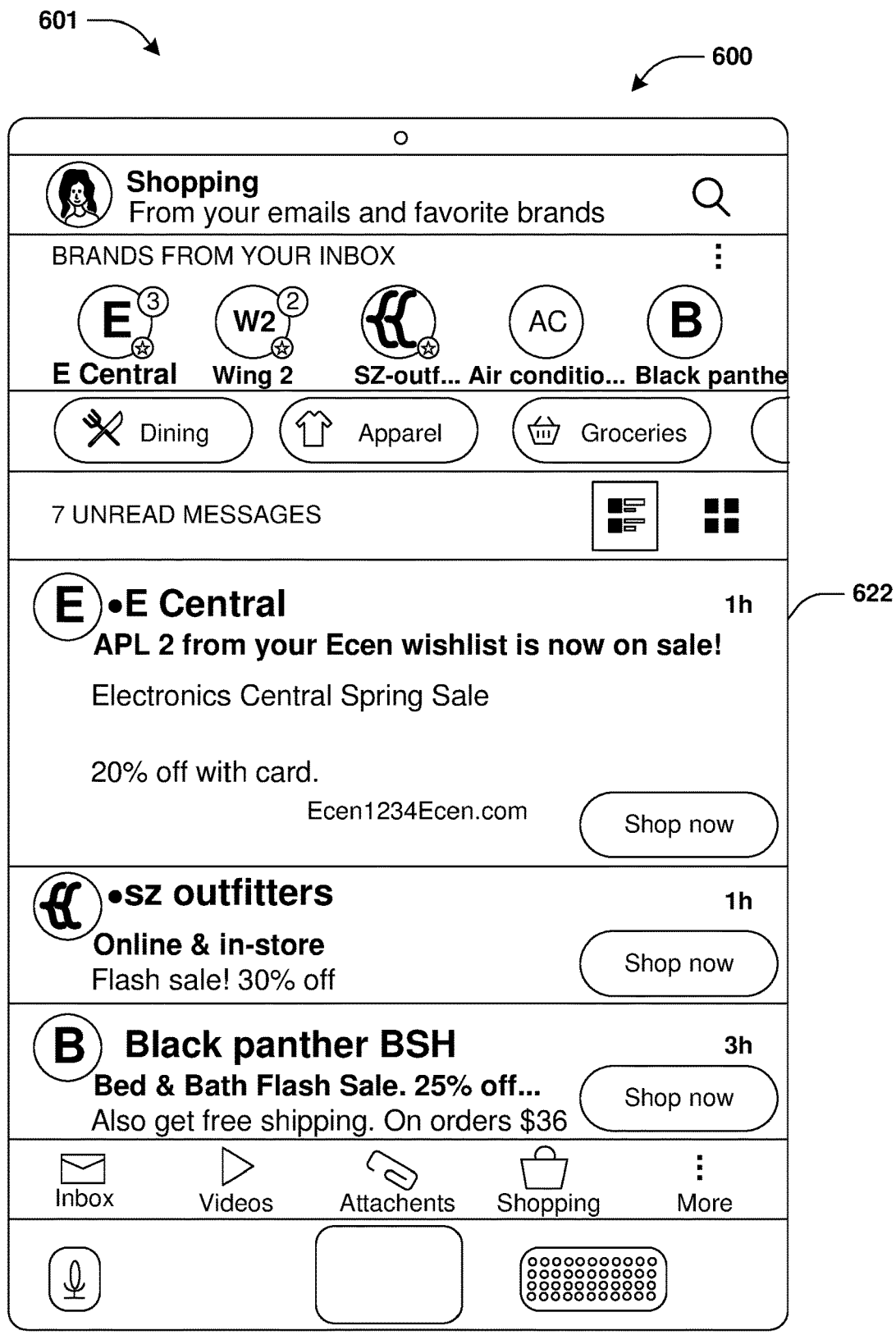
FIG. 6D is a diagram illustrating an example system for generating and providing a user-specific interface for display via one or more client devices.

FIG. 6D illustrates a fourth interface 607 that may be displayed on the device of the user (e.g., after the user selects the notification 602 displayed in FIG. 6A), such as when the user is determined (e.g., by the user-specific machine learning model trained using interactions of the user) to have a user interest in viewing an expanded representation of the message in the context of the shopping tab and/or other shopping-related messages, and a user-specific interface representative of that determined user interest is generated and/or presented to the user. The fourth interface 607 may comprise the shopping tab that displays one or more messages of the user that have shopping-related content, including the message represented by the notification 602 of FIG. 6A. The fourth interface 607 may comprise an expanded representation 622 of the message, which may include one or more portions of the message (e.g., further text and/or images from a body of the message) that were not included in the condensed representation of the message illustrated in FIG. 6C. The fourth interface 607 may further comprise condensed representations of one or more other shopping-related messages of the user.

It may be appreciated that training a user-specific machine learning model based upon interactions, generating a user-specific message interface based upon the user-specific machine learning model, providing the user-specific interface for display and/or receiving one or more additional interactions (e.g., with and/or in association with the user-specific interface) as feedback that may be used to further train the user-specific machine learning model may create a closed-loop process allowing usage of feedback to tailor and/or continuously update the user-specific machine learning model used to generate user-specific interfaces, thereby improving (e.g., continuously improving over time) a quality and/or accuracy of generation and/or presentation of user-specific interfaces for one or more applications of a device. Closed-loop control may reduce errors and produce more efficient operation of a computer system which implements the user-specific machine learning model and/or generates and/or presents user-specific interfaces. The reduction of errors and/or the efficient operation of the computer system may improve operational stability and/or predictability of operation. Accordingly, using processing circuitry to implement closed loop control described herein may improve operation of underlying hardware of the computer system.

Alternatively and/or additionally, implementation of at least some of the disclosed subject matter may lead to benefits including, but not limited to, a reduction in screen space and/or an improved usability of a display (e.g., of the client devices 502, 504, 506 and/or of the device illustrated in FIGS. 6A-6D) (e.g., as a result of automatically providing user-specific interfaces to each client device based upon a user-specific machine learning model tailored to each user, such that the first user does not need to perform various navigation functions and/or open a different application and/or web page to search for and/or find content specific to the first user (e.g., shopping-related content) when accessing a first message, and/or the second user does not need to perform various navigation functions and/or open a different application and/or web page to search for and/or find content specific to the second user (e.g., content related to unsubscribing from a mailing list) when accessing the (same) first message).

In some examples, the client device is configured to display a menu listing one or more features (e.g., selectable features) of the application. The one or more features may comprise a message viewing feature and/or a tab viewing feature, for example. In an example, in response to a selection of the message viewing feature, the message viewing feature may provide one or more resources (e.g., data, an interface, etc.) for displaying and/or engaging with a message (such as using one or more of the techniques provided herein). In response to a selection of the tab viewing feature, the tab viewing feature may provide one or more resources (e.g., data, an interface, etc.) for displaying and/or facilitating engagement with messages associated with a category of the tab, such as shopping, attachments, videos, etc. In some examples, the client device is configured to display (as a user-specific interface, for example) an application summary that can be reached directly from the menu and/or responsive to selecting a notification, wherein the application summary displays a combination of data offered within the one or more features and/or a limited list of data offered within the one or more features. In some examples, each of the data in the limited list of data is selectable to launch the respective feature (of the one or more features) and enable the selected data to be seen within the respective feature. In some examples, the application summary is displayed while the one or more features are in an un-launched and/or unopened state.

In some examples, at least some of the disclosed subject matter may be implemented on a client device, and in some examples, at least some of the disclosed subject matter may be implemented on a server (e.g., hosting a service accessible via a network, such as the Internet). While one or more acts and/or components may be described and/or illustrated herein as being performed and/or implemented on a computing device, such as a client device or on a server, such descriptions and/or illustrations are exemplary, and alternative embodiments may be contemplated in which such acts and/or components are performed and/or implemented on one or more other computing devices. For example, acts and/or components described and/or illustrated in examples herein as being performed and/or implemented on a client device may be performed and/or implemented on one or more servers, and/or acts and/or components described and/or illustrated in examples herein as being performed and/or implemented on a server may be performed and/or implemented on one or more client devices.

Figure 7:
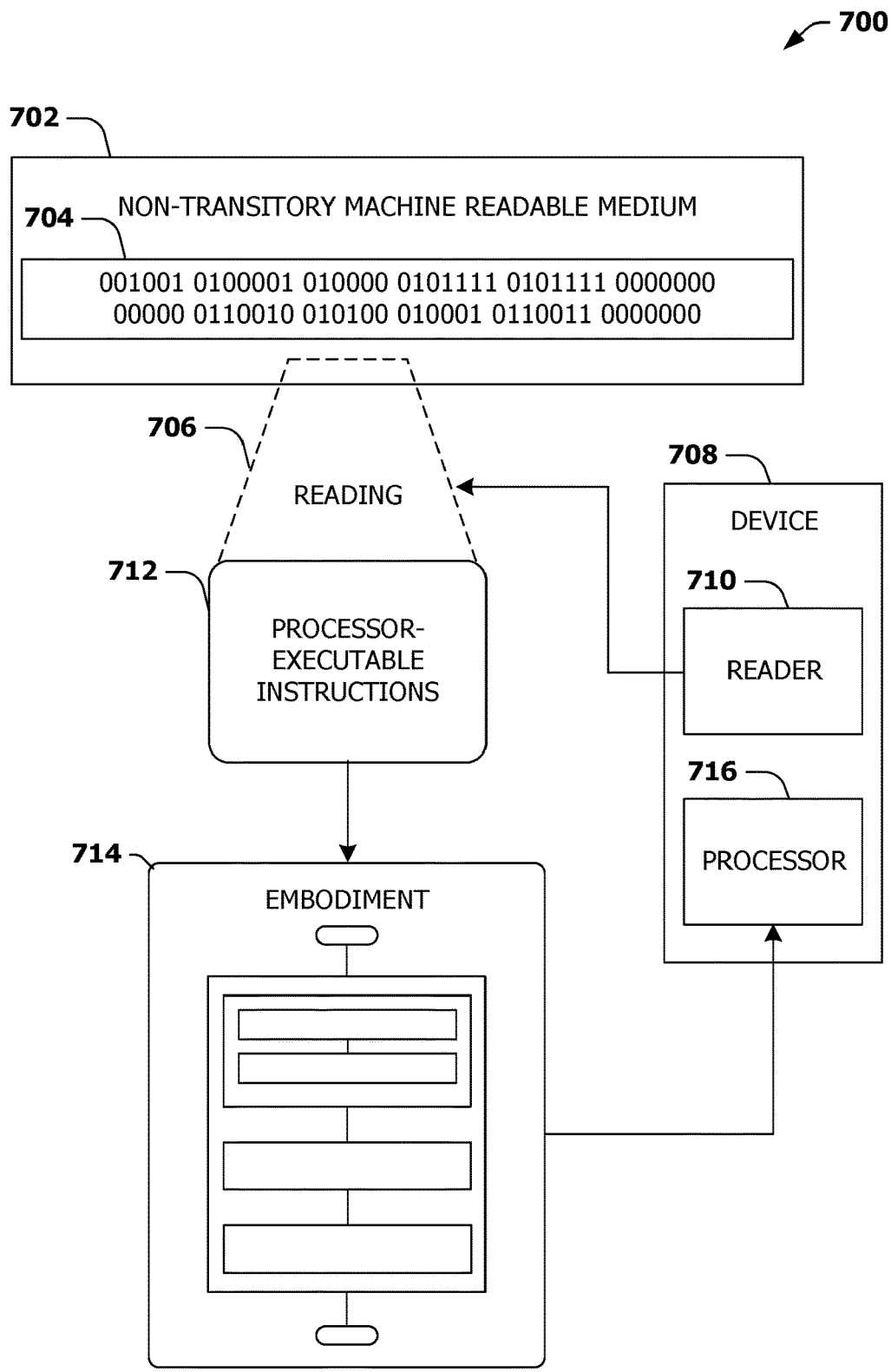
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the exemplary system 501 of FIGS. 5A-5C and/or the exemplary system 601 of FIGS. 6A-6D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    training a user-specific machine learning model, for a user of an email application, based upon one or more interactions of the user with a device upon which the email application is installed;
    determining that an email message has been received by an email account of the user;
    generating a user-specific message interface based upon (i) the trained user-specific machine learning model trained based upon the one or more interactions of the user and (ii) content of the email message, wherein the generating the user-specific message interface comprises:
        determining, based upon the trained user-specific machine learning model, a user interest associated with the content of the email message; and
        identifying, for use in generation of the user-specific message interface, a tab of the email application from among a plurality of tabs including a first tab of the email application and a second tab of the email application, wherein the tab is identified using the user interest determined based upon the trained user-specific machine learning model;
    providing, for display on the device of the user, a notification of the email message; and
    responsive to the user selecting the notification of the email message, providing the user-specific message interface, comprising the identified tab, for display on the device of the user.

2. The method of claim 1, wherein the generating the user-specific message interface comprises:
    generating supplemental content based upon the user interest; and
    combining the content of the email message with the supplemental content to create the user-specific message interface.

3. The method of claim 1, wherein the generating the user-specific message interface comprises:
    generating supplemental content based upon the user interest; and
    using the supplemental content to create the user-specific message interface.

4. The method of claim 1, comprising:
    applying one or more attributes of the email message to the user-specific machine learning model; and
    predicting, using the user-specific machine learning model after applying the one or more attributes, that the user will have the user interest upon viewing the content of the email message.

5. The method of claim 1, wherein the generating the user-specific message interface is further based upon a time of at least one of:
    receiving the email message;
    providing the notification; or
    the user selecting the notification.

6. The method of claim 1, wherein the generating the user-specific message interface is further based upon a location of the device at a time of at least one of:
    receiving the email message;
    providing the notification; or
    the user selecting the notification.

7. The method of claim 1, comprising:
    training a second user-specific machine learning model, for a second user, based upon one or more second interactions of the second user with a second device;
    determining that a second email message has been received by a second email account of the second user;
    generating a second user-specific message interface based upon (i) the second trained user-specific machine learning model and (ii) second content of the second email message;
    providing, for display on the second device of the second user, a second notification of the second email message; and
    responsive to the second user selecting the second notification of the second email message, providing the second user-specific message interface for display on the second device of the second user.

8. A computing device comprising:
    a processor; and
    memory comprising processor-executable instructions that when executed by the processor cause performance of operations, the operations comprising:
        training a user-specific machine learning model, for a user of an application, based upon one or more interactions of the user with a device upon which the application is installed;
        determining that a message has been received by an account of the user;
        generating a user-specific message interface based upon (i) the trained user-specific machine learning model trained based upon the one or more interactions of the user and (ii) content of the message, wherein the generating the user-specific message interface comprises:
            determining, based upon the trained user-specific machine learning model, a user interest associated with the content of the message; and
            identifying, for use in generation of the user-specific message interface, a tab of the application from among a plurality of tabs including a first tab of the application and a second tab of the application, wherein the tab is identified using the user interest determined based upon the trained user-specific machine learning model;

providing, for display on the device of the user, a notification of the message; and responsive to the user selecting the notification of the message, providing the user-specific message interface, comprising the identified tab, for display on the device of the user.

9. The computing device of claim 8, wherein the generating the user-specific message interface comprises:

generating supplemental content based upon the user interest; and combining the content of the message with the supplemental content to create the user-specific message interface.

10. The computing device of claim 8, wherein the generating the user-specific message interface comprises:

generating supplemental content based upon the user interest; and using the supplemental content to create the user-specific message interface.

11. The computing device of claim 8, the operations comprising:

applying one or more attributes of the message to the user-specific machine learning model; and predicting, using the user-specific machine learning model after applying the one or more attributes, that the user will have the user interest upon viewing the content of the message.

12. The computing device of claim 8, wherein the generating the user-specific message interface is further based upon a time of at least one of:

receiving the message;
providing the notification; or
the user selecting the notification.

13. The computing device of claim 8, wherein the generating the user-specific message interface is further based upon a location of the device at a time of at least one of:

receiving the message;
providing the notification; or
the user selecting the notification.

14. The computing device of claim 8, the operations comprising:

training a second user-specific machine learning model, for a second user, based upon one or more second interactions of the second user with a second device;

determining that a second message has been received by a second account of the second user;

generating a second user-specific message interface based upon (i) the second trained user-specific machine learning model and (ii) second content of the second message;

providing, for display on the second device of the second user, a second notification of the second message; and responsive to the second user selecting the second notification of the second message, providing the second user-specific message interface for display on the second device of the second user.

15. A non-transitory machine readable medium having stored thereon processor-executable instructions that when executed cause performance of operations, the operations comprising:

training a user-specific machine learning model for a user based upon one or more interactions of the user with a device comprising a content;

determining that the content has been received in association with the user;

generating a user-specific interface based upon (i) the trained user-specific machine learning model trained based upon the one or more interactions of the user and (ii) the content, wherein the generating the user-specific interface comprises:

determining, based upon the trained user-specific machine learning model, a user interest associated with the content; and identifying, for use in generation of the user-specific interface, a tab of an application from among a plurality of tabs including a first tab of the application and a second tab of the application, wherein the tab is identified using the user interest determined based upon the trained user-specific machine learning model;

providing, for display on the device of the user, a notification of the content; and responsive to the user selecting the notification of the content, providing the user-specific interface, comprising the identified tab, for display on the device of the user.

16. The non-transitory machine readable medium of claim 15, wherein the generating the user-specific interface comprises:

generating supplemental content based upon the user interest; and combining the content with the supplemental content to create the user-specific interface.

17. The non-transitory machine readable medium of claim 15, wherein the generating the user-specific interface comprises:

generating supplemental content based upon the user interest; and using the supplemental content to create the user-specific interface.

18. The non-transitory machine readable medium of claim 15, the operations comprising:

applying one or more attributes of the content to the user-specific machine learning model; and predicting, using the user-specific machine learning model after applying the one or more attributes, that the user will have the user interest upon viewing the content.

19. The non-transitory machine readable medium of claim 15, wherein the generating the user-specific interface is further based upon at least one of:

a time of at least one of:
receiving the content; or
the user accessing the content; or a location of the device at the time of at least one of:
receiving the content; or
the user accessing the content.

20. The non-transitory machine readable medium of claim 15, the operations comprising:

training a second user-specific machine learning model for a second user based upon one or more second interactions of the second user;

determining that second content has been received in association with the second user;

generating a second user-specific interface based upon (i) the second trained user-specific machine learning model and (ii) the second content;

providing, for display on a second device of the second user, a second notification of the second content; and responsive to the second user selecting the second notification of the second content, providing the second user-specific interface for display on the second device of the second user.

\* \* \* \* \*